United States Patent
Schluetter et al.

(10) Patent No.: US 8,571,959 B2
(45) Date of Patent: *Oct. 29, 2013

(54) SYSTEM AND METHOD FOR COALESCING MARKET DATA AT A NETWORK DEVICE

(71) Applicant: Trading Technologies International, Inc, Chicago, IL (US)

(72) Inventors: Jens-Uwe Schluetter, Evanston, IL (US); Stephen A. Schwarz, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/689,644

(22) Filed: Nov. 29, 2012

(65) Prior Publication Data

US 2013/0085923 A1 Apr. 4, 2013

Related U.S. Application Data

(63) Continuation of application No. 13/527,425, filed on Jun. 19, 2012, now Pat. No. 8,352,344, which is a continuation of application No. 13/305,835, filed on Nov. 29, 2011, now Pat. No. 8,229,823, which is a continuation of application No. 12/476,611, filed on Jun. 2, 2009, now Pat. No. 8,090,637, which is a continuation of application No. 11/416,395, filed on May 2, 2006, now Pat. No. 7,567,930, which is a continuation of application No. 10/183,845, filed on Jun. 26, 2002, now Pat. No. 7,552,077.

(51) Int. Cl.
*G06Q 40/00* (2012.01)

(52) U.S. Cl.
USPC ............................................. 705/35; 705/37

(58) Field of Classification Search
USPC .................................................... 705/37, 35
See application file for complete search history.

(56) References Cited

U.S. PATENT DOCUMENTS

| | | |
|---|---|---|
| 3,962,685 A | 6/1976 | Isle |
| 4,868,866 A | 9/1989 | Williams, Jr. |
| 5,297,032 A | 3/1994 | Trojan et al. |

(Continued)

FOREIGN PATENT DOCUMENTS

WO  02/17193 A1  2/2002

OTHER PUBLICATIONS

Taylor, P., "Second Quarter Sales Surge but Competition Depresses Margins" [online], *Financial Times*, London, United Kingdom, Jul. 28, 1998, p. 4. [Retrieved on Aug. 28, 2008] from the Internet: http://proquest.umi.com/, ProQuest Document ID: 32380156.

(Continued)

*Primary Examiner* — Thomas Dixon
*Assistant Examiner* — Benjamin S Fields
(74) *Attorney, Agent, or Firm* — McDonnell Boehnen Hulbert & Berghoff LLP (57) ABSTRACT

A network device coalesces data received from an exchange, and provides a user with the opportunity to receive fewer, but up-to-date, data updates from an exchange when duplicate prices become available or a large volume of prices becomes available suddenly. Accordingly, the trader can be assured of receiving non-duplicated prices that are fed at a rate that is cohesive with that trader's connection speed. The present invention is designed to conserve on bandwidth thereby increasing the likelihood that bandwidth will be available to receive desirable market information.

20 Claims, 4 Drawing Sheets

(56) References Cited

U.S. PATENT DOCUMENTS

| | | |
|---|---|---|
| 5,515,359 A | 5/1996 | Zheng |
| 5,680,116 A | 10/1997 | Hashimoto et al. |
| 5,802,310 A | 9/1998 | Rajaraman |
| 6,058,389 A | 5/2000 | Chandra et al. |
| 6,073,180 A | 6/2000 | Onoda et al. |
| 6,097,399 A | 8/2000 | Bhatt et al. |
| 6,278,982 B1 | 8/2001 | Korhammer et al. |
| 6,408,000 B1 | 6/2002 | Lamberg et al. |
| 6,553,035 B1 | 4/2003 | Schwartz et al. |
| 6,675,153 B1 | 1/2004 | Cook et al. |
| 6,772,132 B1 | 8/2004 | Kemp, II et al. |
| 7,127,424 B2 | 10/2006 | Kemp, II et al. |
| 7,133,460 B2 | 11/2006 | Bae et al. |
| 7,167,923 B2 | 1/2007 | Lo |
| 7,212,997 B1 | 5/2007 | Pine et al |
| 7,310,615 B2 | 12/2007 | Lewis |
| 7,389,268 B1 | 6/2008 | Kemp, II et al. |
| 7,552,077 B1 | 6/2009 | Schluetter et al. |
| 7,567,930 B1 | 7/2009 | Schluetter et al. |
| 7,599,867 B1 | 10/2009 | Monroe et al. |
| 7,685,049 B1 | 3/2010 | Singer |
| 8,090,637 B2 | 1/2012 | Schluetter et al. |
| 8,229,823 B2 | 7/2012 | Schluetter et al. |
| 2002/0026528 A1 | 2/2002 | Lo |
| 2002/0097697 A1 | 7/2002 | Bae et al. |
| 2004/0162772 A1 | 8/2004 | Lewis |
| 2009/0240633 A1 | 9/2009 | Schluetter et al. |
| 2012/0072325 A1 | 3/2012 | Schluetter et al. |
| 2012/0259767 A1 | 10/2012 | Schluetter et al. |

OTHER PUBLICATIONS

Paul, et al. "Course 24: OpenGL and Window System Integration", Presented at Special Interest Group on Graphics and Interactive Techniques (SIGGRAPH), Los Angeles, Aug. 3-8, 1997. http://www.siggraph.org/s97/conference/courses/24.html.

SYSTEM AND METHOD FOR COALESCING MARKET DATA AT A NETWORK DEVICE

CROSS REFERENCE TO RELATED APPLICATIONS

This application is a continuation of U.S. patent application Ser. No. 13/527,425, filed Jun. 19, 2012, entitled "System and Method for Coalescing Market Data at a Network Device", now U.S. Pat. No. 8,352,344, which is a continuation of U.S. patent application Ser. No. 13/305,835, filed Nov. 29, 2011, entitled "System and Method for Coalescing Market Data at a Network Device", now U.S. Pat. No. 8,229,823, which is a continuation of U.S. patent application Ser. No. 12/476,611, filed Jun. 2, 2009, entitled "System and Method for Coalescing Market Data at a Network Device", now U.S. Pat. No. 8,090,637, which is a continuation of U.S. patent application Ser. No. 11/416,395, filed May 2, 2006, entitled "System and Method for Coalescing Market Data at a Network Device", now U.S. Pat. No. 7,567,930, which is a continuation of U.S. patent application Ser. No. 10/183,845, filed Jun. 26, 2002, entitled "System and Method for Coalescing Market Data at a Network Device", now U.S. Pat. No. 7,552,077, the contents of all of which are fully incorporated herein by reference.

FIELD OF THE INVENTION

The present invention is generally directed to controlling bandwidth allocation in an electronic trading environment, and in particular, manages time-sensitive communication.

BACKGROUND

Trading methods have evolved from a manually intensive process to a technology enabled, electronic platform. Advances in technology are having an increasingly large and broad impact on trading and the way in which exchanges conduct business. What was previously seen as a supplement to the traditional pit trading, electronic trading platforms continue to increase in importance and popularity. The advent of electronic trading has meant that a customer can be in virtually direct contact with the market, from practically anywhere in the world, performing near real-time transactions, and without the need to make personal contact with a broker. Electronic trading systems are also convenient for floor brokers on the floor at an exchange for receiving orders electronically.

As a result, the number of market participants continues to increase as does market volatility. Such an increase in the number of market participants may result in more competitive prices, while also contributing to the liquidity of the market. However, potential complications may also result. One such complication may be that updates of market data (e.g., price updates, order updates, or fill updates) occur more frequently than can be processed by the software systems monitoring those market data updates.

Consider the following illustration whereby a client subscribes to price updates on Microsoft stock (MSFT), and connects using a slow 28,800 bps modem. Assume that at a certain point in time the volume in the MSFT market increases and price updates start flowing at a rate that is beyond what can be delivered over the slow connection to the client. Most server devices have an internal message queue, which is an ordered list of messages, from which updates are taken out on a first in, first out (FIFO) basis by applications running on the device. However, as a result of the increasing flow of price updates, the internal message queue for the server will continue to grow until the market's volume burst subsides (if it does subside). Because the contents in the queue will be growing, and the messaging system is obligated to deliver all of the messages in the queue, the client will receive and begin to display price updates that are increasingly outdated.

In some circumstances like the example given above, the trader will be trading on the basis of old information, which is unacceptable and can have disastrous results. In other circumstances, the internal message queue will backup until ultimately there is a failure that typically results in the disconnection of the client, which is also unacceptable and eventually prevents the trader from actively participating in the electronic market altogether.

To avoid some of these problems, traders might subscribe to the fastest connection (e.g., having the highest throughput and lowest latency) available in their area, such as a dedicated T1 line or ISDN. Usually, but not all of the time, a fast connection can help a trader avoid some of these timing issues. However, these fast connections often come at a high price. This high price is typically considered a necessary price to pay according to some traders who trade in fast moving markets, while it is not so desirable for other traders, perhaps those who trade in slower moving markets. Regardless of the type of trader, for those traders who do not wish to pay the high price associated with these types of high performance connections, they are often at a great disadvantage in many aspects, one of which was described in the example above.

Even if a trader subscribes to a fast connection, it doesn't always mean that they will have access to it. With the advent of electronic trading, a trader isn't necessarily required to trade at any particular location. Advances in computers now permit users to be highly mobile. As long as there is a network connection available, a trader can trade anywhere in the world. Therefore, even if a trader subscribes to a fast connection having plenty of bandwidth, he or she may not be always in allocation with access to it (i.e., wireless trading).

Furthermore, even if every trader has access to a fast connection, then the burden shifts to the provider of such information such as the exchange or some third-party provider. If every trader requires a high bandwidth connection, then the provider of the information must be able to supply all of the high-bandwidth connections often equating to higher operating costs, which are then relayed back to the trader. Therefore, giving every trader access to a fast connection will not always result in the optimum solution.

DETAILED DESCRIPTION

A need in the art is addressed by providing a system and related methods for distributing time sensitive information using software that manages communication between a network device and a client device residing within an electronic trading environment. A system and related methods for coalescing time-sensitive information at a client device is described in U.S. patent application Ser. No. 10/184,498, contemporaneously filed on Jun. 26, 2002, entitled "A System and Method for Data Coalescing at a Client Device," the contents of which are incorporated herein by reference.

While the present invention is described herein with reference to illustrative embodiments for particular applications, it should be understood that the invention is not limited thereto. Those having ordinary skill in the art and access to the teachings provided herein will recognize additional modification, applications, and embodiments within the scope thereof would be of significant utility.

Illustrative embodiments and example applications will now be described with reference to the accompanying figures to disclose advantageous teachings of a preferred embodiment of the present invention.

Figure 1:
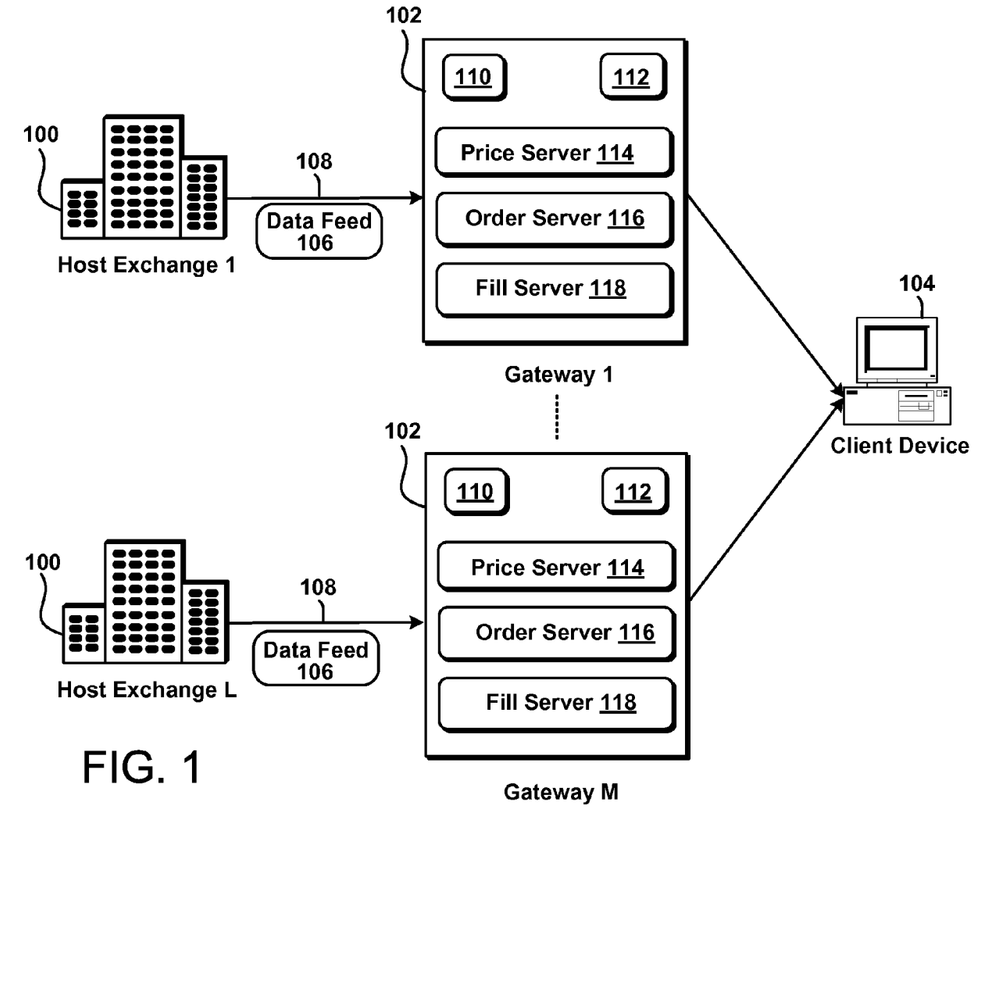
FIG. 1 shows a system diagram of network devices receiving data from exchanges and relaying the data to a client device in accordance with a preferred embodiment.

FIG. 1 shows a system diagram of gateways receiving data from exchanges and relaying the data to a client device in accordance with a preferred embodiment. In the preferred embodiment, the system generally includes one or more host exchanges 100, one or more gateways 102, and one or more client devices 104. Preferably, the system can support up to L host exchanges 100 and corresponding M gateways 102, and can also support N client devices (although N client devices are not shown for sake of clarity), where L, M, and N represent any number. A host exchange 100 might include an Electronic Communication Network (ECN) like Island, which is a well-known electronic trading facility. Other host exchanges include the Chicago Mercantile Exchange (CME), the Xetra (a German stock exchange), and the European derivatives market (Eurex). According to the preferred embodiment, the gateways 102 are computers (or software programs) running software that receives information from the host exchange (i.e., price, order, and fill information) and, among other things, coalesces that information into one or more data feeds having one or more data rates. The client device 104 is a computer (or software program) that receives one or more data feeds from the gateway at a designated data rate, which is compatible to the connection speed between the client device 104 and gateways 102. The host exchanges 100, gateways 102, and client device 104 are explained below in their respective sections.

It should be understood that the present invention is not limited to any particular network architecture, but rather may be applied with utility on any electronic device in any network that can be used for electronic trading. Furthermore, the invention is not limited to a completely electronic trading environment where orders are sent to an electronic matching engine. For example, the invention could be utilized with an electronic trading application that sends orders electronically to a terminal where a person (e.g., a floor broker) executes those orders in a traditional open outcry trading floor.

Host Exchange

Each host exchange 100 provides different types of information, and relays this information, or a portion thereof, collectively referred to as a data feed, over a network to market participants or traders. A data feed from one exchange may contain different information representing different tradeable objects than another data feed from a second exchange. However, it is not necessary in the preferred embodiment that the data feeds from exchanges include the same data or different data.

As used herein, the term "tradeable objects," refers simply to anything that can be traded with a quantity and/or price. It includes, but is not limited to, all types of tradeable objects such as financial products, which can include, for example, stocks, options, bonds, futures, currency, and warrants, as well as funds, derivatives and collections of the foregoing, and all types of commodities, such as grains, energy, and metals. The tradeable object may be "real", such as products that are listed by an exchange for trading, or "synthetic", such as a combination of real products that is created by the user.

In general, a data feed 106 may include information representing prices and quantities for a tradeable object. For example, the data feed 106 could include data corresponding to a price and/or quantity at the inside market and/or data corresponding to a price and quantity in the market depth. The inside market includes data corresponding to a tradeable object including the highest bid price with quantity and the lowest ask price with quantity. Data feeds 106 from some exchanges also include data corresponding to the market depth. Market depth is represented by the available order book, including the current bid and ask quantities and their associated prices. In other words, subject to the limits noted below, market depth is each available pending bid and ask quantity (or any aggregation or combination thereof), entered at a particular price, in addition to the "inside market." The data feed 106 can contain other types of market information such as the last traded price (LTP), the last traded quantity (LTQ), order information, and/or fill information. The information in a data feed 106, whether it contains the inside market and/or market depth or more market information, is generally categorized into three groups referred to as price, order, and fill information.

In a preferred embodiment, each host exchange 100 sends a data feed 106 to a gateway 102. The data feed 106 preferably carries all of the information that the exchange 100 provides, such as price, order, and fill information, and alternatively may include more (or less) information. The host exchange 100 may send its data feed 106 to the gateway 102 over a dedicated line 108, which is a communications channel that permanently connects the exchange to the gateway. Dedicated lines may be private or leased lines such as T1 lines, which are known by those skilled in the art. Alternatively, the host exchange 100 may send its data feed 106 to the gateway 102 over a switched network such as a wide area network (WAN), global network of computers (Internet), legacy networks that utilize X25 protocol or also IBM LU6.2 SNA protocol, satellite broadcast systems that use leased satellite channels to broadcast price data, or networks that utilize packet switched technology such as ATM or Frame relay.

According to the preferred embodiment, if there were five exchanges, then each exchange would correspond to a gateway, and then according to this example there would be five gateways. When a trader wants to participate in the market at two of the five exchanges, he or she can subscribe only to the data feeds that correspond to those two exchanges. If the trader decides to drop one of the exchanges or add another exchange, he or she may preferably do so at any time.

In another embodiment, all host exchanges send their data feeds to a single gateway. For example, if there were five exchanges, then each exchange would sends its data to the single gateway. Then, when a trader wants to participate at two of the five exchanges, he or she can simply subscribe to the data feeds that correspond to those two exchanges at the gateway. Also, if the trader decides to drop one of the exchanges or add another exchange, he or she may do so at any time.

In yet another embodiment, some exchanges may have multiple gateways, so that if there were five exchanges, then there might be three gateways supporting each of them; for fifteen gateways. This embodiment allows for a load balancing, among other benefits, of the gateways' workstations.

Gateway

As mentioned earlier, the gateway 102 is one or more computers (or program(s)) that receive information from the host exchange 100. As used herein, a computer includes any device with memory 110 and a processor 112 capable of processing information to produce a desired result. Thus, a gateway can be a computer of any size such as a server, workstation, personal computer, or laptop, but generally, the gateway is any computer device that has the processing capability to perform the function described herein. Moreover, it should be understood that the functions of the gateway could be moved to the exchange and/or the client device to reduce or eliminate the need for a gateway.

In the preferred embodiment, the gateway 102 receives a data feed 106 from an exchange 100. Preferably, the gateway 102 receives the data feed 106 and converts it to a form compatible with the protocols used by the client device 104 using conversion techniques known in the art. Also, as known by those skilled in the art, the gateway 102 may have one or more servers to support the data feeds, such as a price server 114 for processing price information, an order server 116 for processing order information, and a fill server 118 for processing fill information. Generally, a server is a computer or program that responds to commands from a client in the form of subscriptions. That is, a trader at a client device can subscribe to price information, order information, and fill information for that exchange. Once a client device has subscribed to the information, the gateway 102 publishes the information at data rate compatible with the connection to the client device 104.

Client Device

As mentioned before, the client device 104 is one or more computers (or program(s)) that allow a trader to participate in the market hosted at the exchange 100. In general, it uses software that creates specialized interactive trading screens on the client device's terminal. The trading screens enable traders to enter and execute orders, obtain market quotes, and monitor positions. The range and quality of features available to the trader on his or her screens varies according to the specific software application being run.

A commercially available trading application that allows a user to trade in a system like that shown in FIG. 1 is X_TRADER® from Trading Technologies International, Inc. of Chicago, Ill. X_TRADER® also provides an electronic trading interface, referred to as MD Trader™, in which working orders and/or bid and ask quantities are displayed in association with a static price scale. The preferred embodiments, however, are not limited to any particular product that performs the translation, storage and/or display functions. Portions of the X_TRADER® and the MD Trader™-style display are described in U.S. patent application Ser. No. 09/590,692, entitled "Click Based Trading With Intuitive Grid Display of Market Depth," filed on Jun. 9, 2000, and U.S. patent application Ser. No. 09/971,087, entitled "Click Based Trading With Intuitive Grid Display Of Market Depth And Price Consolidation," filed on Oct. 5, 2001, the contents of both are incorporated by reference herein. Moreover, the trading application may implement tools for trading tradeable objects that are described in a U.S. patent application Ser. No. 10/125,894 filed on Apr. 19, 2002, entitled "Trading Tools for Electronic Trading," the contents of which are incorporated by reference.

Data Coalescing

Figure 2:
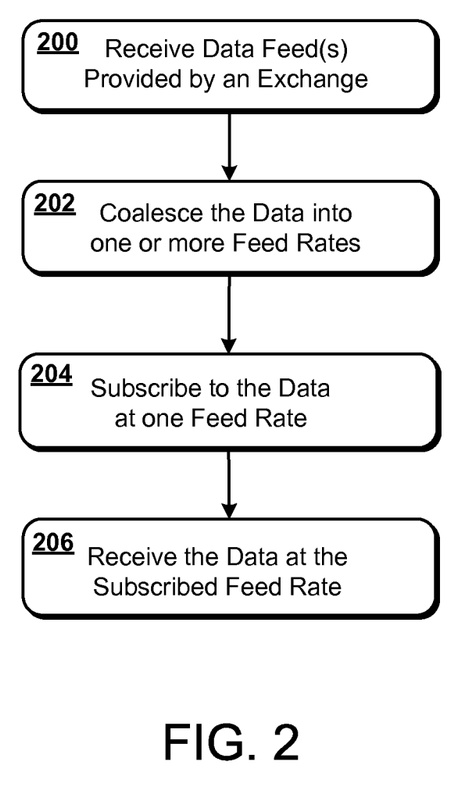
FIG. 2 shows a flowchart for one embodiment of a method to publish information according to the connection capability between a network device and a client device.

FIG. 2 shows a flowchart for one embodiment of a method to publish information according to the connection capability between a gateway and a client device. The method illustrates one way to publish information in accordance with a preferred embodiment. Other embodiments of will be apparent to those skilled in the art in light of this disclosure. For example, the present invention may readily be implemented using configurations and techniques other than those described herein. Additionally, the methods described herein may effectively be used in conjunction with systems other than the systems described above.

In the FIG. 2 embodiment, initially, in step 200, a data feed is provided by an exchange to a gateway upon request by the trader at the client device. As described above and as known by one skilled in the art, the data feed may include price information, order information, and/or fill information. The exchange may have one or more tradeable objects contained within its data feed.

The data feed is transmitted electronically from the exchange to the gateway. For example, the data feed may contain one or more blocks of text (or the data feed might not be block based at all) or binary data as well as beginning and ending characters, a header (such as a destination address, type of message, and other types of information), and/or error-checking or synchronizing information. In another example, an exchange may provide a wire protocol, while another exchange might provide a callback interface (e.g., a library) that the gateway may link with to communicate.

Preferably, the bandwidth (i.e., the data transfer capacity or speed of transmission) between the exchange and gateway is enough to allow the gateway to receive all the information that the exchange continuously (or non-continuously) makes available to the trader. If there are bandwidth limitations between the exchange and the gateway, then the methods described herein may be used to regulate the data feeds between them. For example, a network device at the exchange may coalesce data feeds and publish information in many different rates to accommodate different connection types.

In step 202, a network device such as a gateway can coalesce the data feed into one or more date feeds having different data rates. The client device can subscribe to information from a gateway at different service levels. Each service level corresponds to a different rate of publishing. For example, if the bandwidth between the client device and the gateway is high (e.g., using a dedicated T1), then the gateway would publish the information at the highest rate, a rate equivalent to (or near equivalent to) the rate at which the gateway receives the information from the exchange. However, if the bandwidth between the client device and the gateway were lower (e.g., having 56 kilobits per second available), then according to the preferred embodiment, the gateway would publish the information at a rate compatible for the lower bandwidth connection.

To accommodate the different service levels, the gateway preferably publishes information at different rates corresponding to the different levels of service. For example, rather than publishing every price update that is entered at an exchange and received by the gateway, the price server at the gateway can be configured to publish the price feed that corresponds to the client's connection speed. The levels of service can be represented as price updates, and may be defined in a numerical series, such as "PF 1", "PF 0.5," "PF 0.10," "PF 0.15," etc., where "PF 1" represents a client with the highest connection speed, "PF 0.5" represents a client with a connection speed that only allows for a rate of one price update per 5 ms (milliseconds), "PF 0.10" for a rate of one price update per 10 ms, and "PF 0.15" for a rate of one price update per 15 ms, and so on. Of course, there are other ways to define service levels and data rates.

Figure 3A:
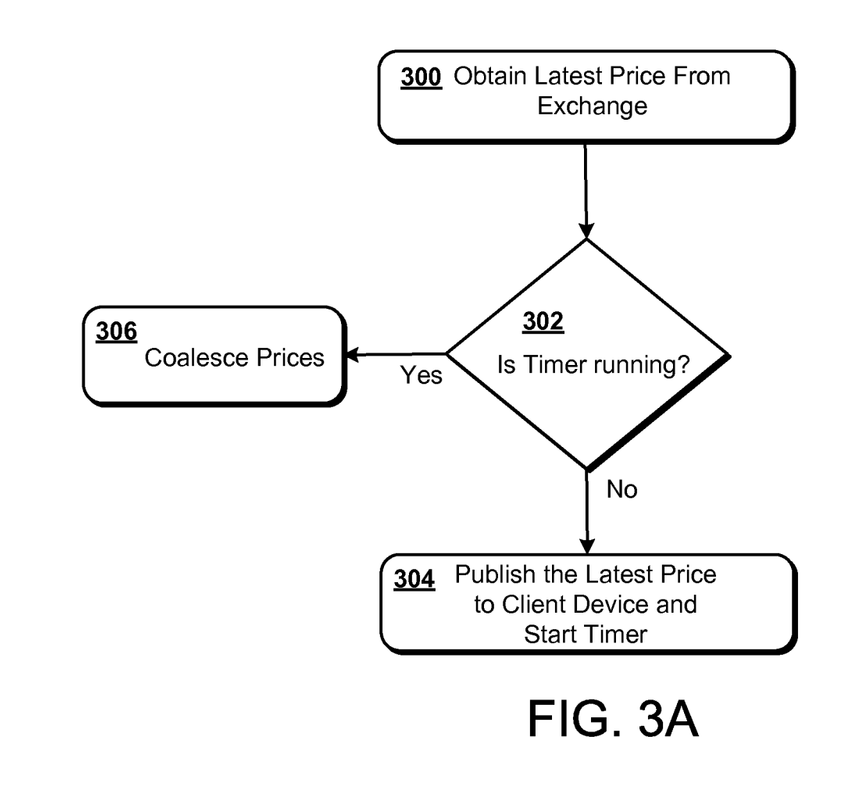
FIGS. 3A and 3B show flowcharts for one embodiment of a method to coalesce data according to a service level.
Figure 3B:
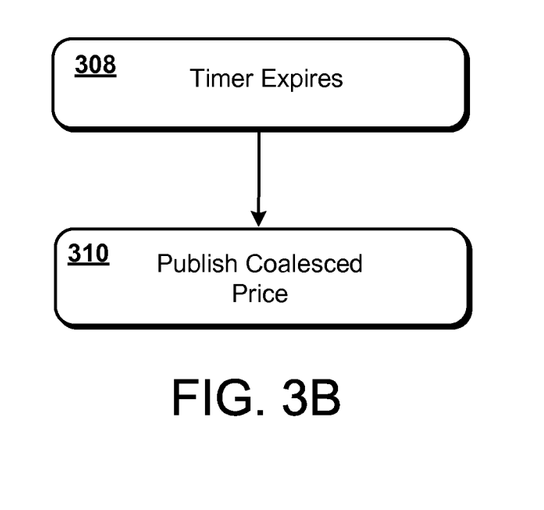

Referring back to step 202, the data feed is coalesced according to the appropriate service level. To illustrate this step, FIGS. 3A and 3B show flowcharts for one embodiment of a method to coalesce data according to a service level. Initially, in step 300, the gateway receives data such as price update 1 from an exchange. However, the exchange may continue to provide updates to the price such as price 2. Also, assume that price 1 has a different value from price 2, and so on, otherwise, the gateway, in one embodiment, does not send updates with the same value as the previous update.

In step 302, a timer is checked to determine if it is running. The timer can include a simple software routine that indicates the end of an interval of time. The timer can also be a software or a hardware interrupt that causes the program to go to the next step. The type of timer used to implement the embodiments described herein does not limit the present invention.

In step 304, if the timer is not running, then price update is published to the corresponding client devices, and the timer is started at time, T=0 ms (or some other unit of time).

In step 306, price updates are coalesced. In a preferred embodiment, the incoming market data feed could include price updates indicating that a price update has occurred in the market. In one embodiment, a price update is a message sent from the exchange that contains the current best bid price and/or best ask price (i.e., the inside market) for a tradeable object. In another embodiment, a price update is a message that contains the entire set of bid prices and/or ask prices and/or corresponding quantities currently in the market. Of course, a price update can mean many different things besides those described above, depending on the type of tradeable object, how the exchange defines it, and/or how the programmer defines it. It should be understood that other types of updates might occur instead of price updates. For example, order updates and/or fill updates may also occur, where an order update is a message that contains a working order that has been placed into the market, and where a fill update is a message that contains information indicating when a working order has been filled. Again, other types of updates may occur, and the present invention is not limited to the type of update. Moreover, other items of interest may be delivered to the client device 104 instead of price, order, and fill updates, such information might include the Last Traded Price (LTP), Last Traded Quantity (LTQ), Best Bid Quantity, and/or Settlement Price.

In a preferred embodiment, when an update occurs, the data included in the update is stored in a data structure, which may reside in memory 110. The data structure may be a record or an array that stores market data into one or more fields. According to one embodiment, the data structure has at least one field that stores price information such as a price update. As mentioned before, the update can include other items of interest such as price updates for the market depth, LTP, LTQ, and so on.

In a preferred embodiment, at any point in time the contents of the data structure reflect the most current state of events. This is done by the following. If a new update supercedes an old update, the new update replaces the old update in the data structure. If there is an update that provides additional information, that update is added to the data structure in its appropriate field. It is also possible that a new update may lead to a modification of a field stored in the data structure.

Whether or not an update has occurred, if T<0.5 ms, then the process occurs over again starting back at step 300 until T=0.5 ms (or, similarly, T>0.5 ms).

In step 308, when the timer expires, or according to this example, when T reaches the data rate (T=data rate=0.5 ms, or alternatively, T>data rate=0.5 ms), then the latest data is published, per step 310, and the client device will receive the most recent data.

A more detailed example is provided to better illustrate the method of FIGS. 3A and 3B. Assume that the data is a price feed update and that the data rate is set to 5 ms to accommodate a connection speed. At the time of a new session with the gateway (e.g., when the client device logs onto the gateway), the first price update is published, and the time is started. When T=5 ms, the timer will go off, and if no new price updates were received from the exchange, then an update will not be published. If, for example, a new price is added when T=6 ms, and taking into account that an update has not been published in more than 5 ms, the new price will be published, and a new 5 ms timer is started at T=6 ms. Should another new price come in when T=7, that price will not be published because an update was just published when T=6 ms. In the preferred embodiment, however, the gateway will store the price update at 7 ms in memory for possible inclusion in a future update. When T=11 ms, the 5 ms timer will expire again, and the price received at 7 ms will now be published assuming no new prices were updated in the meantime. This process can continue until the session with the gateway is ended (e.g., when the client device logs off of the gateway).

Referring back to FIG. 2, in step 204, the trader subscribes to a data rate or service level. The service level may be manually entered or automatically entered based on automatically determining the connection performance.

In one embodiment, a service level may be manually entered at the gateway. In this embodiment, a trader can notify an administrator the type of connection the trader's client device has to the gateway. Based on the type of connection, the administrator can determine the service level that is appropriate for the connection speed. For example, if the connection is a T1, then an appropriate service level might be "PF 1," if the connection is a cable modem, then an appropriate service level might be "PF 0.5," and so on. Based on the service level, the trader's client device can subscribe to data feeds at the corresponding data rate. The administrator can enter the correct service level or data rate directly into the messaging software corresponding to the appropriate server at the gateway.

In another embodiment, a service level may be configured at the gateway by requesting from the trader on the terminal of his or her client device, the type of connection the trader's client device has. In this embodiment, the trader is asked to select the connection speed through a command-line entry or graphical user interface displayed on the terminal of the client device. For example, a graphical user interface might include a menu that lists available connection options: T1, ISDN, Cable Modem, DSL (digital subscriber loop), dial-up modem, and so on. In another example, a graphical user interface might include a menu that lists available connection options: greater than 500 Mbps (million bits per second), between 500 to 160 kbps (kilobits per second), or less than 160 kbps, and so on (or some other numerical categories). According to either example, the trader can select his or her connection speed and trader's client device can subscribe to the data feed that has the appropriate rate.

In yet another embodiment, a level of service may be configured automatically. Latency and bandwidth define the speed and capacity of the connection between the client device and the gateway. In general, latency is the time it takes for a packet to travel from a source to a destination. Bandwidth is the amount of data that can be transmitted over the connection in a fixed amount of time. By measuring the latency and/or bandwidth, the level of service can be automatically (e.g., by the gateway) or manually (e.g., entered by an administrator or the trader) adjusted accordingly.

One way to measure latency and/or bandwidth includes measuring a first latency for an idle connection and measuring a second latency for a loaded connection. Then, if the second latency is exponentially greater than the first latency, the data rate may be dynamically adjusted to a slower rate. Alternatively, if the second latency is near the first latency dynamically adjusting the data rate to an increased rate. For example, when the throughput (or bandwidth) of a connection is insufficient, then the latency tends to jump up to an extreme level. Assume that a modem connection would have a normal latency of 200 ms (milliseconds) at idle, or equivalently at no load, and under a normal load the latency is measured at 300 ms. If the same connection were overloaded, the latency might jump exponentially to over 2 seconds or even more, if additional data flows in.

Another way to measure latency includes pinging the gateway (or the client device) to determine the time it takes to make a round trip (e.g., client to gateway to client) or a one-way trip (e.g., client to gateway).

Yet, another way to measure latency includes using a system of synchronized clocks, where the gateway would timestamp every packet transmitted over the connection (or a single packet in a certain interval) to measure latency.

It should be understood that there are other ways known to one skilled in the art on how to measure latency and bandwidth or any similar type of network metric, and that the present invention is not limited by the particular methods described herein of measuring them.

Referring back to FIG. 2, in step 206, the client device receives data at the subscribed data rate. That is, the trader will receive data updates (e.g., price update) within the designated time configuration (e.g., data rate).

Figure 4:
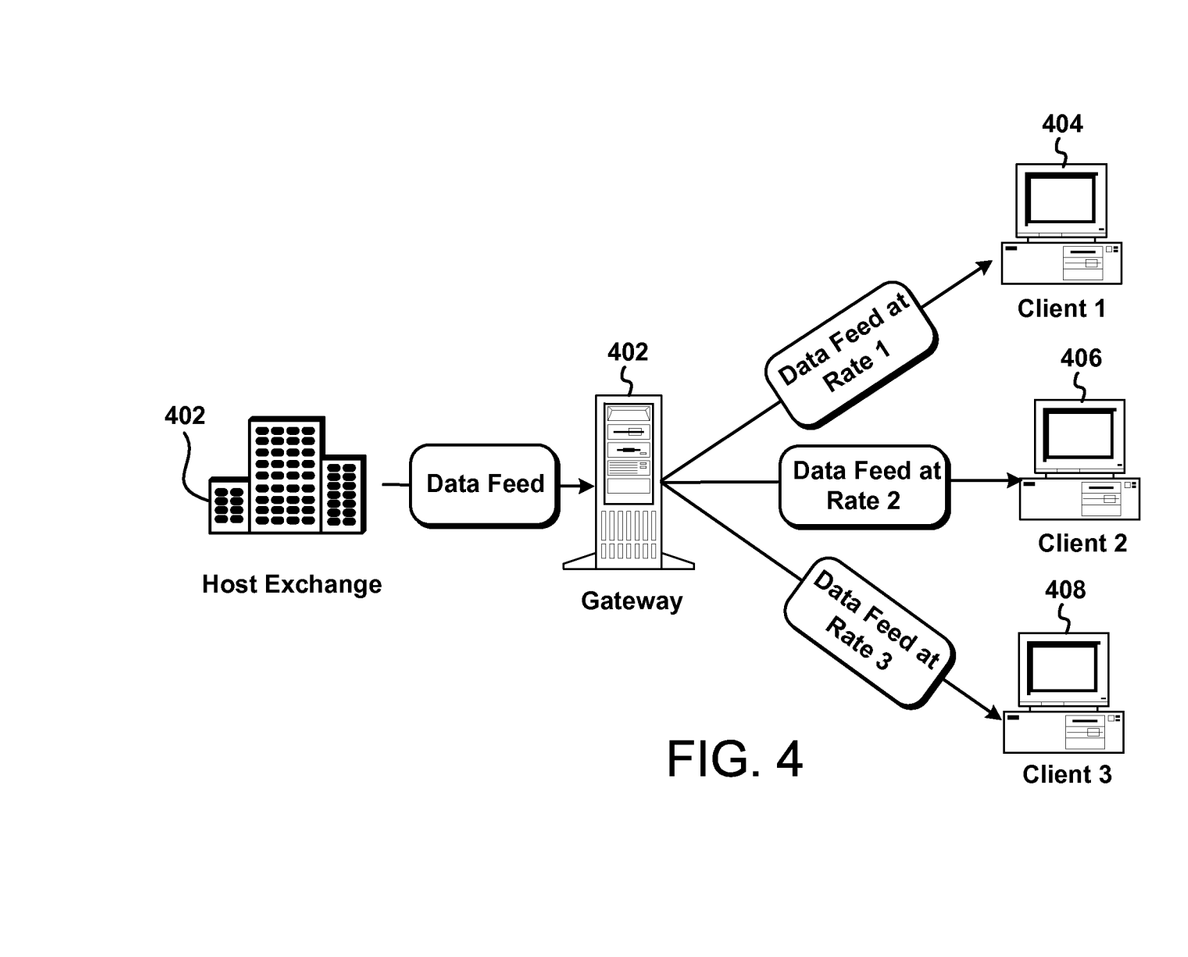
FIG. 4 shows an embodiment of a network device receiving data from an exchange and relaying the data at varying data rates to the client devices.

FIG. 4 shows an embodiment of a gateway 400 receiving data from an exchange 402 and relaying the data at varying data rates to the client devices 404, 406, and 408. As described above, data feed(s) are sent from the exchange 402 to the gateway 402. Each client device 404-408 subscribes to the data feed(s) of interest from the exchange at a data rate consistent with their connection speed.

In one embodiment, the data feeds generated at the same data rate are multicast to those client devices that require the same data rate. Multicasting is a process known in the art of sending a message simultaneously to more than one destination on a network. According to this embodiment, the gateway 402 would use different multicast groups (or subject names) to publish data for different service levels. For example, referring to FIG. 4, assume that data feed at rate 1 is the same as data feed at rate 2 (i.e., rate 1=rate 2). Then, client device 1 (404) and client device 2 (406) would subscribe to the service level that publishes and multicasts the data feeds at that rate to those client devices. Also according to this example, client device 3 (408) might have a different connection speed than client device 1 (404) and 2 (406), such that client device 3 (408) subscribes to a service level different from the service level used by client devices 1 and 2 (404-406).

In another embodiment, the gateway 402 and a client device 404 are connected in a point-to-point network connection, and the gateway can automatically adjust the data rate by monitoring how fast the data updates are consumed by the client device 404. A point-to-point connection is a well-known communications link in which dedicated links exist between individual them, as opposed to a point-to-multipoint configuration, in which the same signal goes to many destinations, as in the above embodiment. In a point-to-point connection, when the gateway sends a data feed update to the client device, it expects to get a confirmation that the data feed update was received. This confirmation is known in the art as an acknowledgment or a message sent by the client device 404 to the gateway 402 indicating either that the unit is ready to receive transmission or that a transmission was received without error. When data feed updates are repeatedly sent to the client 404 device, but the gateway 402 is receiving acknowledgement messages for updates that occurred many updates ago, the gateway 402 can move the client device 404 to a different service level to prevent excessive queuing.

CONCLUSION

The embodiments address the problems found in the prior art by providing a system and method for distributing time sensitive information to one or more client devices. According to an embodiment, communication between a network device and a client device is managed by the network device residing within an electronic trading environment. Data feeds are adjusted automatically or manually at the network device to accommodate the trader's specific connection needs. The network device may be located at the exchange or remote from the exchange, depending on how the network is configured. The system and related methods described herein may be utilized in very small trading operations or in big trading operations spanning over large geographical areas.

The foregoing description is presented to enable one of ordinary skill in the art to make and use the invention. Various modifications to the preferred embodiment will be readily apparent to those skilled in the art and the generic principles herein may applied to other embodiments. For example, other types of market information may be coalesced or updated using the teachings described herein such as fill updates. To illustrate, when a fill update comes into the gateway, instead of replacing old fill information with new fill information, the present embodiments can "update" the old fill information with the new fill information. To demonstrate, assume that a partial fill update comes into the gateway (e.g., 50 contracts were filled of an order to buy 100 contracts). Then, later another update for the same tradeable object comes into the gateway before the timer expires (e.g., 25 contracts were filled of an order to buy 100 contracts). Then, according to one embodiment, the old fill update is "updated" with the new information, and thus the new update would be 75 contracts filled of an order to buy 100 (50 contracts from the first update+25 contracts from the second update=75 contracts).

In addition, it is intended that the invention be highly flexible. In one embodiment, certain types of data may be exempted from coalescing. For example, any data that a user may want to accumulate (such as LTQ) could be exempted and not coalesced (i.e., all LTQ updates can be sent once a timer expires). Furthermore, another embodiment could be programmed to cause market data updates to be automatically sent and the timer to be reset if the amount of data temporarily stored reaches a certain a point which would cause a data message from the network device to the client to meet a predefined level such as a maximum transmission unit.

Therefore, it should be understood that the above description of the preferred embodiments, alternative embodiments, and specific examples are given by way of illustration and not limitation. Many changes and modifications within the scope of the present embodiments may be made without departing from the spirit thereof, and the present invention includes all such changes and modifications.

We claim:

1. A method for distributing data for a tradeable object, the method comprising:

distributing, via a network device, market data to a plurality of client devices, where for each client device of the plurality of devices, the market data is distributed at a level of service for a connection between the network device and the client device and includes coalesced market updates in response to a data feed for the market data being received at the network device at a rate being greater than the level of service.

2. The method of claim 1 where each connection between the network device and each client device is different.

3. The method of claim 1 where the level of service for each connection between the network device and each client device is different.

4. The method of claim 1 further comprising automatically adjusting via the network device the level of service to an adjusted level of service.

5. The method of claim 4 where the level of service for the connection between the network device and the client device is automatically adjusted according to at least one of a measured latency and a measured bandwidth for the connection.

6. The method of claim 1 where the level of service is user selected.

7. The method of claim 6 where the level of service is selectable from a plurality of selectable levels of service.

8. The method of claim 1 where the market data comprises at least one of price, order fill updates, last traded price (LTP), last traded quantity (LTQ), best bid price, best bid quantity, best ask price, best ask quantity and settlement price for a tradeable object.

9. The method of claim 1 where the network device comprises a gateway.

10. The method of claim 1, where the coalesced market updates comprise at least one of a replaced value associated with a first market update replaced by a value in a second market update and a value added from a second market update to a first market update.

11. A non-transitory computer readable medium having computer executable instructions stored thereon which when executed cause a computer to carry out acts comprising:

distributing, via a network device, market data to a plurality of client devices, where for each client device of the plurality of devices, the market data is distributed at a level of service for a connection between the network device and the client device and includes coalesced market updates in response to a data feed for the market data being received at the network device at a rate being greater than the level of service.

12. The non-transitory computer readable medium of claim 11 where each connection between the network device and each client device is different.

13. The non-transitory computer readable medium of claim 11 where the level of service for each connection between the network device and each client device is different.

14. The non-transitory computer readable medium of claim 11 where the acts further comprise automatically adjusting via the network device the level of service to an adjusted level of service.

15. The non-transitory computer readable medium of claim 14 where the level of service for the connection between the network device and the client device is automatically adjusted according to at least one of a measured latency and a measured bandwidth for the connection.

16. The non-transitory computer readable medium of claim 11 where the level of service is user selected.

17. The non-transitory computer readable medium of claim 16 where the level of service is selectable from a plurality of selectable levels of service.

18. The non-transitory computer readable medium of claim 11 where the market data comprises at least one of price, order fill updates, last traded price (LTP), last traded quantity (LTQ), best bid price, best bid quantity, best ask price, best ask quantity and settlement price for a tradeable object.

19. The non-transitory computer readable medium of claim 11 where the network device comprises a gateway.

20. The non-transitory computer readable medium of claim 11 where the coalesced market updates comprise at least one of a replaced value associated with a first market update replaced by a value in a second market update and a value added from a second market update to a first market update.

* * * * *